United States Patent
Claus et al.

(10) Patent No.: US 8,332,297 B1
(45) Date of Patent: Dec. 11, 2012

(54) SYSTEMS AND METHODS FOR PROJECTING FUTURE VALUES WHEN PERFORMING RETIREMENT PLANNING

(75) Inventors: Christopher W. Claus, San Antonio, TX (US); Lisa Cobb Alexander, Boerne, TX (US); Paul Fulmer, Boerne, TX (US); Laif Wheeler, Helotes, TX (US); Ivan Quan, San Antonio, TX (US); Jayson Sacco, San Antonio, TX (US); Andrew S. Dempsey, San Antonio, TX (US); Nancy Jane Shutt, Bulverde, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 437 days.

(21) Appl. No.: 12/060,715

(22) Filed: Apr. 1, 2008

(51) Int. Cl.
*G06Q 40/00* (2006.01)

(52) U.S. Cl. ............. 705/36 R; 705/4; 705/35; 705/37; 705/30

(58) Field of Classification Search .............. 705/35–37, 705/30, 4

See application file for complete search history.

(56) References Cited

U.S. PATENT DOCUMENTS

| | | | |
|---|---|---|---|
| 7,577,597 B1 * | 8/2009 | Allison et al. | 705/35 |
| 7,634,436 B1 * | 12/2009 | Wagner | 705/35 |
| 2003/0093352 A1 * | 5/2003 | Muralidhar et al. | 705/36 |
| 2003/0126054 A1 * | 7/2003 | Purcell, Jr. | 705/36 |
| 2005/0246260 A1 * | 11/2005 | Hodgdon et al. | 705/36 |
| 2008/0215501 A1 * | 9/2008 | Rojeck et al. | 705/36 R |

OTHER PUBLICATIONS

Fidelity.com—"Income Products" Retrieved from the Internet <http://personal.fidelity.com/products/incomesolutions/index_content.shtml.cvsr?imm_pid=1&immid=00148&imm_eid=e2770571 &buf=999999> Copyright 1998-2008 FMR LLC.

T.RowePrice, "Retirement Income Calculator—Will Your Retirement Assets Last Your Lifetime?" Retrieved from the internet <http://www3.troweprice.com/ric/RIC/>, pp. 1-11, Copyright 2006, T. Rowe Price Investment Services, Inc.

Dinkytown.net—KJE Computer Solutions, LLC., "Financial Calculators . . . Retirement Income" Retrieved from the internet <http://www.dinkytown.net/java/RetirementIncome.html>, pp. 1-2, © 1998-2007 KJE Computer Solutions, LLC, Minneapolis, MN.

MSN Money, "Retirement Income Calculator," Retrieved from the internet <http://moneycentral.msn.com/investor/calcs/n_retire/main.asp>, Copyright © 2008 Reuters.

CNNMoney.com, "Retirement Planner", Retrieved from the internet <http://cgi.money.cnn.com/tools/retirementplanner/retirementplanner.jsp>, © 2008 Cable News Network.

(Continued)

*Primary Examiner* — Harish T Dass
(74) *Attorney, Agent, or Firm* — Kilpatrick Townsend & Stockton LLP

(57) ABSTRACT

Retirement planning for a person is performed. For each of each class of assets, the income, and the expenses of the person, an analysis is employed that produces a probabilistic distribution of possible future values therefor, and based on each produced distribution derives a respective best case future value, a worst case future value, and a median case future value. Each analysis is conducted by compiling a collection of historical values, performing multiple scenarios based on random inputs to calculate expected future values for each of several particular future periods of time, deriving a probabilistic distribution with distribution values relating to projected future value for each period of time, and deriving a best case future value, a worst case future value, and a median case future value from each probabilistic distribution.

21 Claims, 4 Drawing Sheets

OTHER PUBLICATIONS

Finance.cch.com, "Financial Calculators—Retirement Income", Retrieved from the internet <http://www.finance.cch.com/sohoApplets/RetirementIncome.asp>, pp. 1-3.

AdviceAmerica, "Financial Planning & Retirement Income Planning Software", Retrieved from the internet <http://www.adviceamerica.com/AAweb/index.aspx>, © 2007 AdviceAmerica Inc.

EISI, "Naviplan—Products (US)", Retrieved from the internet <http://www.eisi.com/products/us/index.htm>, © 2008 Emerging Information Systems Inc. All rights reserved.

Morningstar.ca, "Retirement Planning Calculator", Retrieved from the internet <http://www.morningstar.ca/globalhome/rrspplanner/index.asp>, pp. 1-2, Copyright © 2008 Morningstar Research Inc.

* cited by examiner

|  | PERIOD (N) BEST / MEDIAN / WORST (%) | PERIOD (N+1) BEST / MEDIAN / WORST (%) | . . . |
|---|---|---|---|
| ASSET CLASS 1 | B1(N) M1(N) W1(N) | B1(N+1) M1(N+1) W1(N+1) | . . . |
| ASSET CLASS 2 | B2(N) M2(N) W2(N) | B2(N+1) M2(N+1) W2(N+1) | . . . |
| ASSET CLASS 3 | B3(N) M3(N) W3(N) | B3(N+1) M3(N+1) W3(N+1) | . . . |
| ASSET CLASS 4 | B4(N) M4(N) W4(N) | B4(N+1) M4(N+1) W4(N+1) | . . . |
| . . . | . . . | . . . | . . . |
| INFLATION | BI(N) MI(N) WI(N) | BI(N+1) MI(N+1) WI(N+1) | . . . |

Fig. 2A

SYSTEMS AND METHODS FOR PROJECTING FUTURE VALUES WHEN PERFORMING RETIREMENT PLANNING

FIELD

The present disclosure is directed to systems and methods that project future values including asset values when performing retirement planning. More particularly, the present disclosure is directed to such systems and methods that provide more realistic projected future values by applying a repeated random sampling analysis such as a Monte Carlo analysis to project possible future values for each of several classes of assets. Accordingly, the projected future values are not merely presumed to be growing at some predetermined static rate.

BACKGROUND

As is known, retirement planning is performed by an individual or a couple prior to retirement so that the individual/couple (hereinafter, 'person') will at least hopefully have a satisfactory amount of assets at retirement to provide necessary income and/or pay for expenses of the person. Retirement planning can take many forms and can have many goals, and accordingly the types of retirement planning that are performed are many and varied. For example, one type of retirement planning may attempt to maximize tax savings, while another type of retirement planning may attempt to maximize income during retirement. Notably, retirement planning may be performed with a stated goal to have enough assets for the reasonable expectation of life remaining of the person. Conversely, such planning may be performed with a stated goal to maximize the estate bequeathed to beneficiaries after the death of the person.

In any event, retirement planning for a person generally begins with an identification of the assets of the person, as well as an identification of the income and expenses of the person. Thereafter, a future value for each of the assets, income and expenses is projected based on multiple assumptions. Such assumptions are many and varied but are generally known. Generally, for any period of time such as for example a year, assets at the end of the year may be calculated as assets at the beginning of the year plus, income generated from the assets and from other sources, minus expenses that are paid out. Of course, if income remains after expenses, the difference represents a net addition to assets. Conversely, if no income remains after expenses, the difference represents a net reduction from assets.

Projecting the future values for each of the asset, the income, and the expenses, then, requires calculations of net additions to or reductions from assets over multiple years or other periods of time, among other things. Significantly, in projecting such future values over multiple years or other periods of time, the projected values for each of the assets, the income, and the expenses must also be adjusted during each period of time for expected changes due to inflation, changes in market value, and other vagaries attributable to the passage of time.

In the prior art, such adjusting of projected future values was performed by assuming a static rate for inflation and applying the static inflation rate to the assets, income, and expenses of the person during each year or other period of time. Thus, if a person were projected to have assets of 500,000 USD, income of 40,000 USD, and expenses of 40,000 USD in one year and a static inflation rate of 5 percent was assumed, it would be the case at least in a simplified analysis that the person would be projected to have assets of 525,000 USD, income of 42,000 USD, and expenses of 42,000 USD in the next year, and assets of 55,1250 USD, income of 44,100 USD, and expenses of 44,100 USD in the year after.

Notably, such a static rate of inflation is a wildly inaccurate assumption, even if reasonable, say about 6-8 percent or so. That is to say, the rate of inflation in fact varies, and in doing so almost never can be realistically approximated in the context of retirement planning by a single static value. Moreover, such a static rate of inflation often has little if any resemblance to the values of assets in particular over many years, especially inasmuch as the values of assets can be much more volatile. For example, the values of shares of stock in a corporation can fluctuate wildly over time based on market conditions, and the values of bonds usually track oppositely to stocks. Likewise, the value of real estate has been known to appreciate significantly in one year and then depreciate significantly in another, and the values of lumber and metals typically soar during periods of unrest and plummet during periods of calm. Similarly, similar market conditions may affect different classes of assets in an entirely different manner. For example, an increase in the cost of oil usually results in an increase in the cost of plastic, which is typically derived from oil, but a decrease in the cost of automobiles due to slackening demand. As should be understood, then, a reasonable static rate of inflation oftentimes bears little correlation with the change in value of many classes of assets.

Accordingly, a need exists for systems and methods for projecting future values and future asset values in particular that do not rely on a static rate such as a static rate of inflation. More particularly, a need exists for such systems and methods that project future asset values for classes of assets in connection with retirement planning. Even more particularly, a need exists for such systems and methods that project such asset values based at least in part on historical asset values for classes of assets.

SUMMARY

The aforementioned needs are satisfied at least in part by a system and method that performs retirement planning for a person based on the assets of the person, income of the person, and expenses of the person, where the assets of the person may be grouped into classes of assets. For each of each class of assets, the income, and the expenses of the person, an analysis is employed that produces a probabilistic distribution of possible future values therefor, and based on each produced distribution derives a respective best case future value, a worst case future value, and a median case future value.

Each analysis is conducted by compiling a collection of historical values, performing multiple scenarios based on random inputs to calculate expected future values for each of several particular future periods of time, deriving a probabilistic distribution with distribution values relating to projected future value for each period of time, and deriving a best case future value, a worst case future value, and a median case future value from each probabilistic distribution. Each best case future value is employed to calculate a best case future value for the assets of the person, each worst case future value is employed to calculate a worst case future value for the assets of the person, and each median case future value is employed to calculate a median future value for the assets of the person. Thereafter, the best case future value for the assets, the worst case future value for the assets, and the median case future value for the assets of the person are employed to derive best case, worst case, and median case future times of significance to retirement planning for the person.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings:

FIG. 2A is a block diagram of a chart showing the projected future values of percentage changes produced in connection with FIG. 2 for inflation and each of multiple classes of assets and for each of multiple periods of time in accordance with various embodiments of the present innovation.

DETAILED DESCRIPTION

Example Computing Environment

Figure 1:
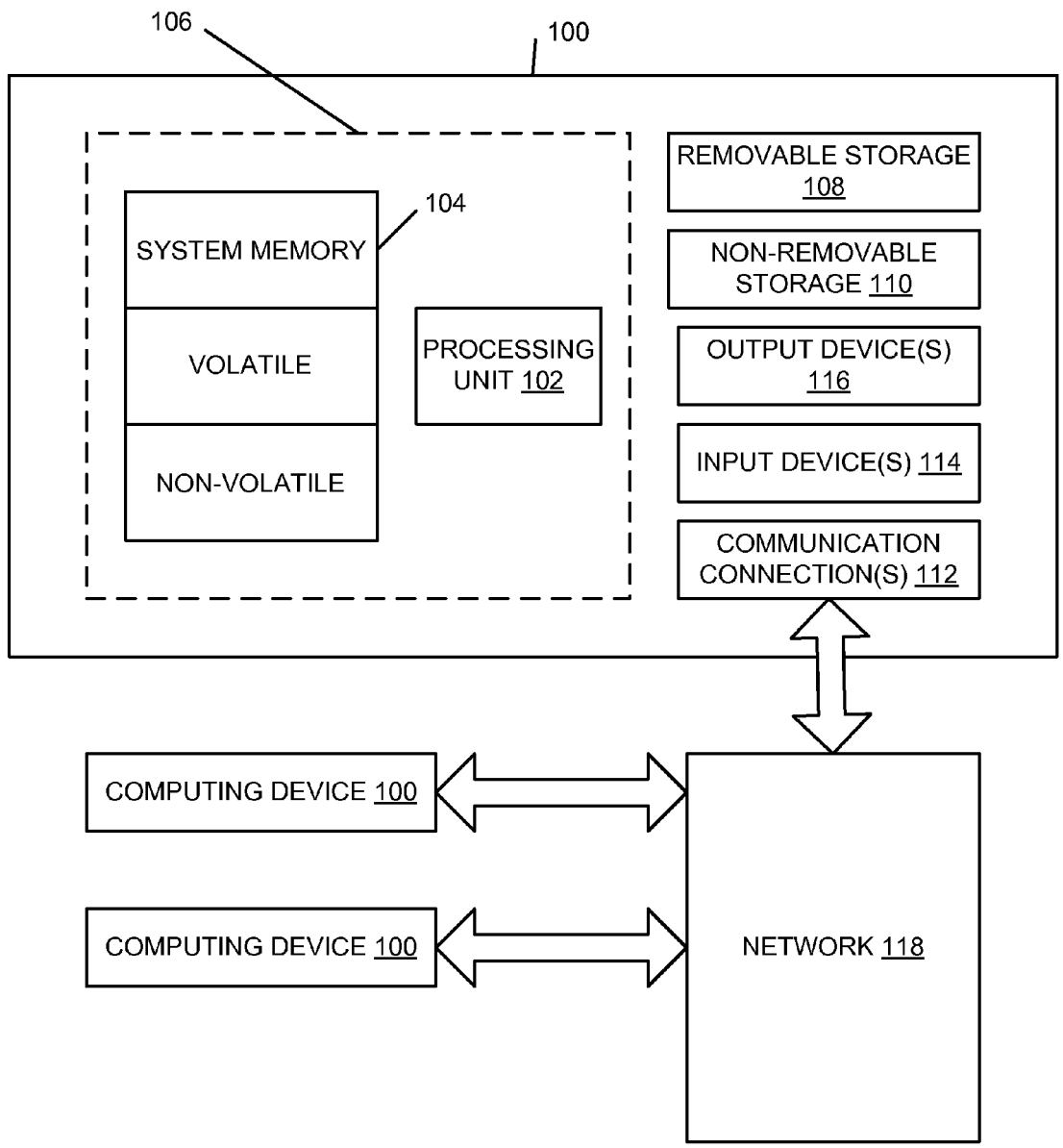
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner.

For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Retirement Planning in General

As was set forth above, retirement planning is performed by an individual or a couple prior to retirement so that the individual/couple (hereinafter, 'person') will at least hopefully have a satisfactory amount of assets at retirement to provide necessary income and/or pay for expenses of the person. Retirement planning can take many forms and can have many goals, and accordingly the types of retirement planning that are performed are many and varied. Generally, any particular type of retirement planning may be performed without departing from the spirit and scope of the present innovation.

One type of retirement planning may attempt to maximize tax savings, while another type of retirement planning may attempt to maximize income during retirement. Notably, retirement planning may be performed with a stated goal to have enough assets for the reasonable expectation of life remaining of the person. At least theoretically, then, the person wishes to have essentially no assets left and all expenses paid on the day that such person dies. Conversely, such planning may be performed with a stated goal to maximize the estate bequeathed to beneficiaries after the death of the person. Here, it may be that the beneficiary is disabled and requires the largest bequeathed estate possible for his or her own needs.

Regardless of the goals of a person, retirement planning for such person usually begins with an identification of the assets of the person, as well as an identification of the income and expenses of the person. For each of the assets, the income, and the expenses, then, a present value may be defined, and a future value is then projected. At least at a basic level, projecting such a future value, as was pointed out above, is performed over multiple periods of times, such as for example years, and generally encompasses determining assets at the beginning of the year, adding income for the year, and subtracting expenses for the year to result in assets at the end of the year. Of course, projecting such a future value may at a more detailed level include a consideration of additional factors without departing from the spirit and scope of the present innovation.

Of course, all of the assets, income, and expenses can be expected to change from year to year, and accordingly the value for each should be adjusted to represent such expected to change. As should be understood, income and expenses can change for a variety of reasons. For example, if the person in fact retires and no longer has a recurring income from employment, overall income will of course decrease. Conversely, if the person begins to draw income from a retirement fund or pension or the like, income may stay relatively steady or may possibly increase. With regard to expenses, it may be the case that the person upon retiring moves into a smaller home and therefore has smaller home-related expenses. Conversely, the person may begin to take long vacation trips, in which case expenses may increase. That said, assuming that all things remain relatively constant, the value of each of income and expenses of a person changes primarily based on the rate of inflation.

However, applying any particular static rate of inflation to income and expenses in the context of retirement planning is a wildly inaccurate assumption, even if reasonable, say about 6-8 percent or so. Again, inasmuch as the actual rate of inflation varies, such varying rate almost never can be realistically approximated in the context of retirement planning by a single static value.

Retirement Planning—Projecting Future Values

Moreover, and significantly, the value of the assets of a person oftentimes bears little correlation if any to inflation. As was pointed out above, the rate of inflation often has little if any resemblance to the values of assets over many years, especially inasmuch as the values of assets can be volatile, and inasmuch as different assets can be expected to act markedly differently based on the same market conditions. As a classic example, bonds overall are usually expected to decrease in value when stocks overall increase in value. Similarly, a discovery of a new technology may be a boon to one industry and at the same time may be the demise of another, with the value of the one increasing and the demise of the other decreasing. Even real estate is subject to such volatility. For example, the value of land may increase substantially if a highway is built nearby, and then may decrease substantially if it is found that the land cannot be developed. As should be understood, then, a reasonable static rate of inflation oftentimes bears little correlation with the change in value of many assets of a person, let alone changes to income and expenses of a person. The value of assets of a person overall, then, changes with little regard for the rate of inflation.

Accordingly, and in various embodiments of the present innovation, retirement planning is performed with regard to classes of asset values, based on the assumption that assets within each class behave somewhat similarly to overall market conditions. Each such class may be any appropriate class without departing from the spirit and scope of the present innovation, presuming that the classes are chosen such that the value of all assets of each class generally change similarly over time. For example, one class may be shares of stock while another may be bonds. However, inasmuch as one particular stock or bond may be materially dissimilar from another particular stock or bond, a finer distinction may be required. Thus, one class may be oil stocks while another may be telecommunications stocks, while one class may be short term municipal bonds while another may be long term private bonds, while another class may be commercial real estate and yet another class may be agricultural real estate. The different classes of assets, then, may be most any classes without departing from the spirit and scope of the present innovation. Note that while such classes may be uniquely defined by a particular retirement planner, it is to be understood that the securities industry has already defined a de facto standard set of such classes, and therefore such a unique definition is likely unnecessary.

Even with such classes of assets, however, a reasonable static rate of inflation oftentimes bears little if any correlation with the change in value of many classes of assets. The value of each class of assets of a person, then, changes with little regard for the rate of inflation. Accordingly, another method of projecting the future value of a class of assets should be employed for retirement planning, as well as for other purposes.

Of course, data available to project the future value of a class of assets mainly includes past values for the class, and in particular past changes of value for the class over periods of time, again typically years. Moreover, estimating future value based on past performance is oftentimes merely little more than a guess. However, such estimating or guessing can be performed in a more systematic or organized and therefore reliable manner according to a Monte Carlo analysis, and accordingly such a Monte Carlo analysis is employed to project the future value of a class of assets in accordance with various embodiments of the present innovation. Such a Monte Carlo analysis is in and of itself generally known or should be apparent to the relevant public, and therefore need not be set forth herein in any detail other than that which is provided.

Generally, a Monte Carlo analysis is a computational algorithm which relies on repeated random sampling to compute results, and are most often employed when simulating physical or mathematical systems with large uncertainty such that it is infeasible if not impossible to compute an exact result with a deterministic algorithm. Monte Carlo analysis relies on repeated computation and random or pseudo-random numbers, and is therefore most suited to calculation by a computer. Note that there is no one single method for performing a Monte Carlo analysis. However, any particular Monte Carlo analysis can be expected to operate by (1) defining a domain of possible inputs; (2) generating inputs randomly from the domain and performing a deterministic computation on the generated inputs; and (3) aggregating the results of the individual computations into a final result.

For example, the value of pi (3.14159265 . . . ) can be approximated using a Monte Carlo analysis. First, draw a square on the ground, then inscribe a circle within the square (defining a domain of possible inputs). Second, randomly and uniformly scatter grains of rice throughout the square (generating inputs randomly from the domain) and determine the proportion of objects within the circle (performing a deterministic computation on the generated inputs). As should be understood, such proportion should be approximately pi/4, which is the ratio of the area of the circle and the area of the square (aggregating the results of the individual computations into a final result). Significantly, any Monte Carlo analysis relies on good random numbers—the grains of rice should be uniformly spread or else the result will be off. Also, any Monte Carlo analysis exhibits a slow convergence to a better approximation as more data points are sampled—more grains of rice uniformly and randomly spread should result in a better final value.

With regard to retirement planning and projecting a future value of a class of assets, then, a Monte Carlo analysis is performed, generally, in the following manner. Initially, and turning now to FIG. 2, a collection of historical (past) values for the class of the asset is compiled (201). Such historical values likely are not actual values inasmuch as the subject is a class of assets and not a particular asset, and accordingly such historical values may for example be year-to-year percentage changes of value calculated over a representative sample of assets in the class, extending back many years. Of course, such historical values may be any values calculated in any appropriate manner and from any appropriate data without departing from the spirit and scope of the present innovation.

As should be understood, each historical value in and of itself reveals little if anything, but in the aggregate the historical values show trends and patterns that may be of use in projecting future values for the class of assets. As but one example, the historical values may show repeating patterns over period of years. At any rate, with the historical values, multiple scenarios are performed based on random inputs to calculate expected future values for the class of assets for each of several particular future periods of time (203). For example, the calculated expected future values and the future periods of time may be yearly percentage changes for the class of assets over each of the next 40 years. Such scenarios and calculations are known or should be apparent to the relevant public and therefore need not be set forth herein in any detail other than that which is provided. Accordingly, such scenarios and calculations may be any appropriate scenarios and calculations without departing from the spirit and scope of the present innovation.

Significantly, if such multiple scenarios are performed enough times for each particular future period of time, say about 500 to 1000 times, the calculated expected future values for the particular period of time can be anticipated to begin to converge into a recognizable probabilistic distribution from which certain probability values can be extracted. In one embodiment of the present innovation, then, a probabilistic distribution relating to projected future value for a particular class of assets is derived based on a Monte Carlo analysis for each of multiple particular periods of time (205), such as for example each of the next 50 years, and from each probabilistic distribution a high case value, a low case value, and a median case value are derived (207).

Such high case, low case, and median case values may be derived in any appropriate manner without departing from the spirit and scope of the present innovation. For example, the high case value may be derived as the point in the distribution where 90 percent of the distribution values are lower, the low case value may be derived as the point in the distribution where 10 percent of the distribution values are lower, and the median case value may be derived as the point in the distribution where 50 percent of the distribution values are lower.

Figure 2:
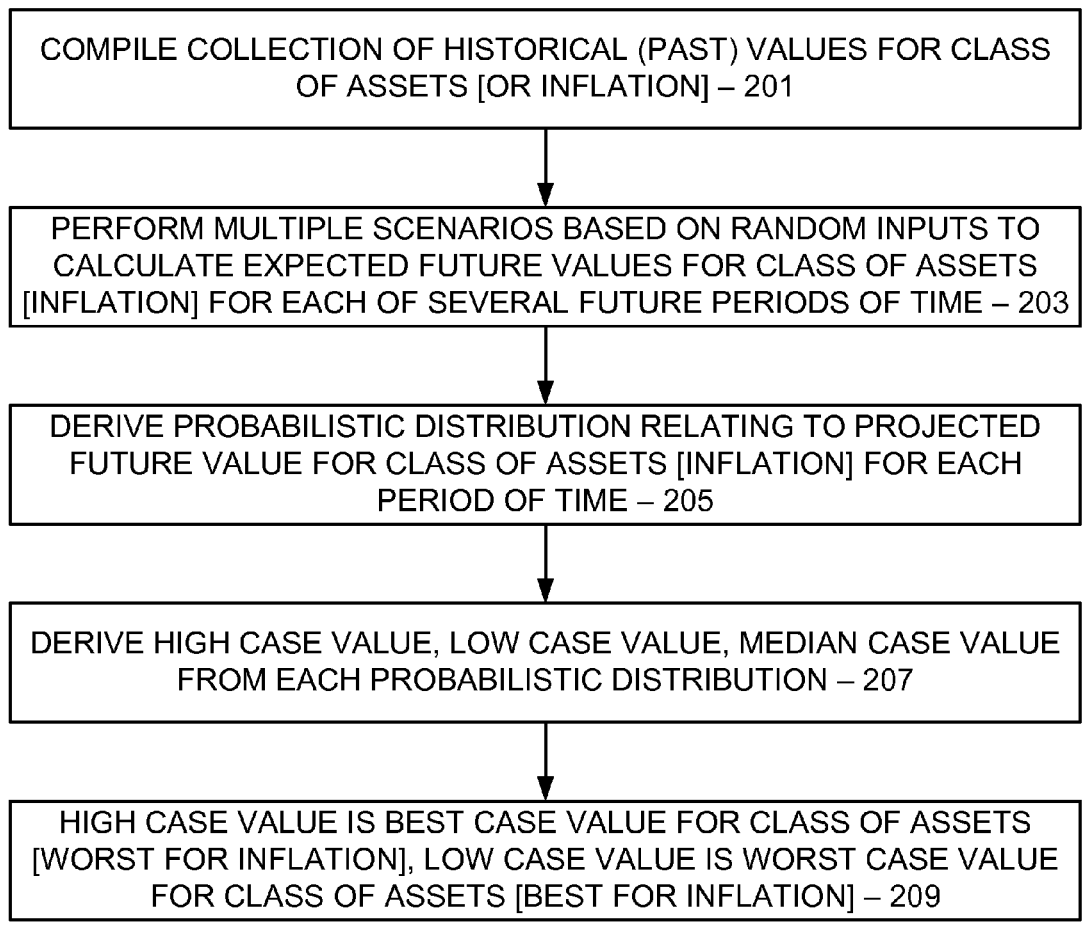
FIG. 2 is a flow diagram showing key actions performed when producing projected future values of percentage changes or the like for classes of assets or inflation by way of a Monte Carlo analysis or the like in accordance with various embodiments of the present innovation.

In any event, such high case, median case, and low case values are calculated for each class of assets for each particular period of time by way of such Monte Carlo analysis. In a similar manner to that which is shown in FIG. 2, and as should now be understood, and in various embodiments of the present innovation, high case, median case, and low case values are also calculated for inflation for each particular period of time by way of such Monte Carlo analysis. As may be appreciated, with regard to assets, each high case value may be considered to be the best case value, while each low case value may be considered to be the worst case value (209). Conversely, with regard to inflation, each high case value may be considered to be the worst case value, while each low case value may be considered to be the best case value.

As seen in FIG. 2A, the projected future worst, median, and best case values for each period of time for each class of assets and also for inflation may be combined into a table or the like for ease of reference. As seen in the table of FIG. 2A, the table may represent each value in each period of time as a percentage change from the immediate previous period of time. Alternately, the may represent each value in each period of time as a cumulative percentage change from a present period of time.

At any rate, with such best, worst, and median case values for a particular class of assets, and presuming that each value for a particular period of time represents a percentage change from a previous period of time and during the particular period of time as is shown in FIG. 2A, it is to be understood that the projected change in the future value for the assets in the class during the particular period of time can be represented in terms of a best case by way of the best case value for the particular class of assets for the particular period of time, in terms of a worst case by way of the worst case value for the particular class of assets for the particular period of time, and in terms of a median case by way of the median case value for the particular class of assets for the particular period of time. Moreover, it is to be understood that the projected change in the future value for the assets in the class during multiple periods of time can be represented in terms of a best case by way of combining the best case values for the particular class of assets over the multiple periods of time, in terms of a worst case by way of combining the worst case values for the particular class of assets over the multiple periods of time, and in terms of a median case by way of combining the median case values for the particular class of assets over the multiple periods of time. As should be understood, such combining of values is accomplished in an appropriate manner such as percentage multiplication. Best, worst, and median case values for inflation may also be calculated in a similar manner. In the course of retirement planning for a person, then, results are presented to the person not in terms of any single projected future value, but in a trio of projected future values that represent a best case, a worst case, and a median case.

Figure 3:
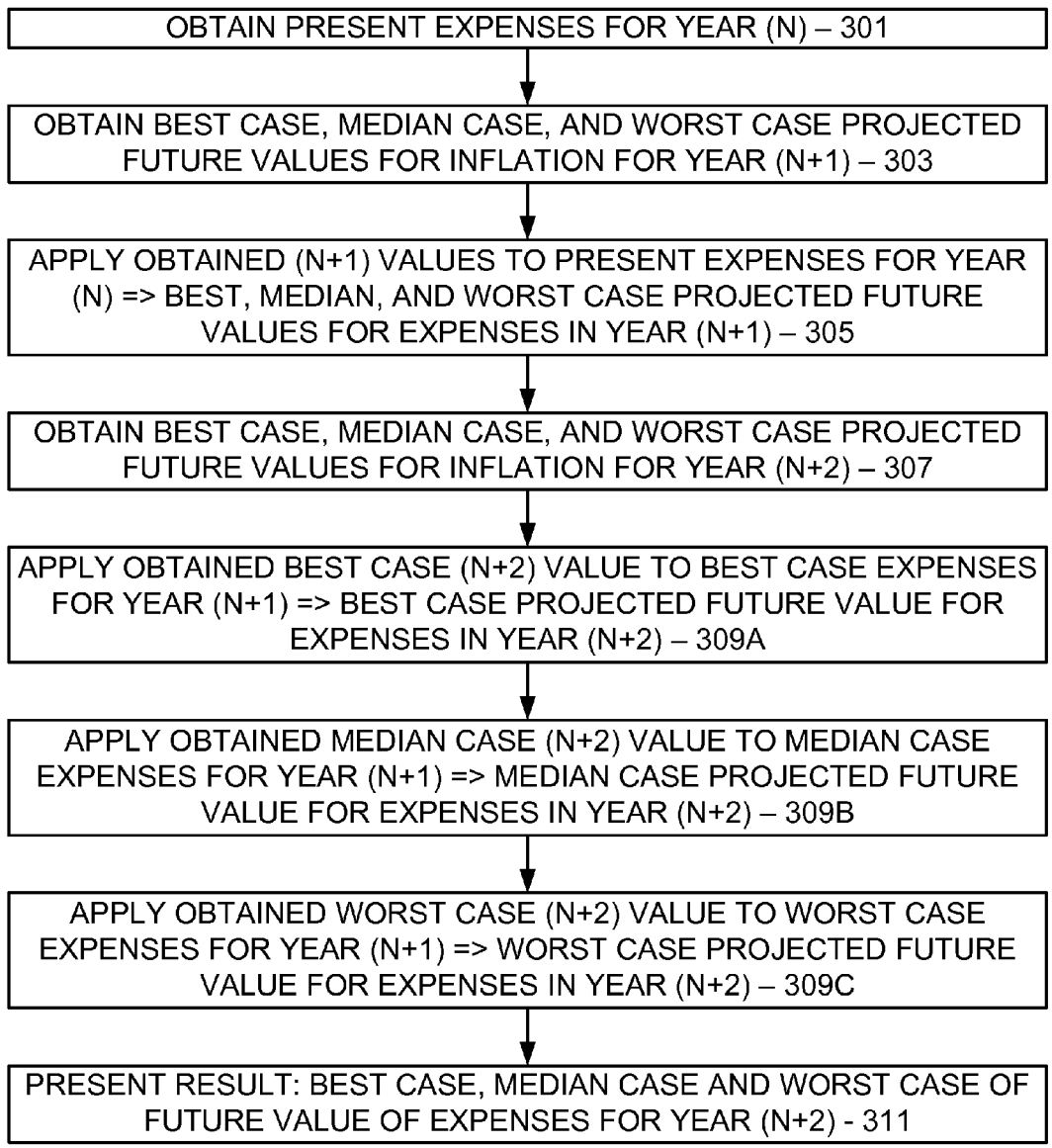
FIG. 3 is a flow diagram showing key actions performed in connection with the chart of FIG. 2A to obtain projected future values for a particular class of asset, income, or expenses when performing retirement planning in accordance with various embodiments of the present innovation.

As but one relatively simple example, and turning now to FIG. 3, it may be the case that in the course of performing retirement planning for a person, the future value of the expenses of the person is projected out two years (n+1, n+2) from the present (n). In such a case, the present expenses is obtained (301) and best case, median case, and worst case projected future values for inflation for year (n+1) are obtained (303) by way of an appropriate Monte Carlo analysis such as that which was set forth above in connection with FIGS. 2 and 2A. Presuming that the best, median, and worst case projected future values for inflation as obtained for year (n+1) are −2%, 2%, and 6%, and also presuming that the present expenses for year (n) are 20,000 USD, the best, median, and worst case projected future values for inflation of −2%, 2%, and 6%, are applied to the present expenses for year (n) of 20,000 USD (305) to result in best, median, and worst case projected future values for expenses in year (n+1) of 19,600 USD, 20,400 USD, and 21,200 USD, respectively.

Thereafter, and as should now be understood, the process iterates. In particular, best case, median case, and worst case projected future values for inflation for year (n+2) are obtained (307) by way of the Monte Carlo analysis. Presuming here that the best, median, and worst case projected future values for inflation as obtained for year (n+2) are 0%, 2%, and 3%, and also presuming that the projected future values for expenses for year (n+1)) are the aforementioned 19,600 USD, 20,400 USD, and 21,200 USD, respectively, the best case projected future value for inflation of 0% is applied to the best case projected future value for expenses in year (n+1) of 19,600 USD (309*a*) to result in a best case projected future value for expenses in year (n+2) of 19,600 USD; the median case projected future value for inflation of 2% is applied to the median case projected future value for expenses in year (n+1) of 20,400 USD (309*b*) to result in a median case projected future value for expenses in year (n+2) of 20,808 USD; and the worst case projected future value for inflation of 3% is applied to the worst case projected future value for expenses in year (n+1) of 21,200 USD (309*c*) to result in a worst case projected future value for expenses in year (n+2) of 21,836 USD. Thus, the result presented (311) is that the future value of the expenses of the person at year (n+2) is 19,600 USD in the best case, 20,808 USD in the median case, and 21,836 USD in the worst case.

Of course, the result presented as at 309 is in reality a range of likely values, and not an actual value, and accordingly the presented result is left to be interpreted as necessary and/or desired. For example, if the interpreter prefers to act conservatively, the worst case value may be taken as the accepted value. Conversely, if the interpreter prefers to act aggressively, the best case value may be taken as the accepted value. As should be understood, then, the median case value might be taken as the accepted value by a neutral interpreter.

As should now be appreciated, the future value of expenses may be projected any number of years or other periods of time in a manner similar to that set forth above, by an iterative process in which each of the projected case values for inflation is applied to a corresponding (n−1)th projected case value for expenses to result in a corresponding (n)th projected case value for expenses. Such projected case values for inflation may also be applied to projected case values for income in a similar manner, just as projected case values for changes in value of a class of assets may be applied to projected case values for the class of assets.

Note that with best, median, and worst case values for assets, income and expenses as projected according to Monte Carlo analysis, retirement planning can be performed in a variety of ways. For example, retirement planning may be performed to calculate case values for a future time when assets will be depleted based on a given amount of initial expenses. By extension, if assets are projected to be depleted too quickly according to the median case values, for example, the initial expenses can be adjusted if possible to an amount that would cause the assets to be depleted less quickly, again according to the median case values. Conversely, if assets are projected to be depleted too slowly according to the median case values, the initial expenses can be adjusted to an amount that would cause the assets to be depleted more quickly, again according to the median case values.

Alternatively, if assets are projected to be depleted too quickly according to the median case values, for example, the values of assets in the various classes of such assets may perhaps be adjusted to a more aggressive but riskier strategy that would produce more income and would cause the assets to be depleted less quickly, again according to the median case values. Conversely, if assets are projected to be depleted too slowly according to the median case values, the values of assets in the various classes of such assets may perhaps be adjusted to a less aggressive and less risky strategy that would produce less income and would cause the assets to be depleted more quickly, again according to the median case values. As should now be understood, with projected future case values as derived based on Monte Carlo analysis, many avenues exist for adjusting retirement planning for a person to better suit the needs of such person.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided for projecting asset values that do not rely on a static rate such as a static rate of inflation. Asset values for a class of assets are projected in connection with retirement planning, based at least in part on historical asset values for the class of assets and application of a Monte Carlo analysis to such historical asset values to result in projected future best, median, and worst case values for such class of assets.

It should be appreciated that changes could be made to the embodiments described above without departing from the innovative concepts thereof. For one example, although the present innovation is set forth in terms of a Monte Carlo analysis, other similar analyses may also be performed without departing from the spirit and scope of the present innovation. It should be understood, therefore, that this innovation is not limited to the particular embodiments disclosed, but it is intended to cover modifications within the spirit and scope of the present innovation as defined by the appended claims.

The invention claimed is:

1. A non-transitory computer-readable medium comprising computer-readable instructions, which when executed by a computer processor, provide for asset valuation projection, the computer-readable instructions comprising instructions for:
   obtaining income, expenses and assets of a person, and classes that the assets are grouped into;
   employing a first analysis that produces a first probabilistic distribution of possible future values for each class of assets for a particular period of time and based on each produced distribution derives for each class of assets a best case future value, a worst case future value, and a median case future value for the class of assets for the particular period of time;
     summing each best case future value for each class of assets to calculate a best case future value for the assets of the person for the particular period of time;
     summing each worst case future value for each class of assets to calculate a worst case future value for the assets of the person for the particular period of time;
     summing each median case future value for each class of assets to calculate a median future value for the assets of the person for the particular period of time;
   employing a second analysis that produces a second probabilistic distribution of possible future values for inflation for the particular period of time and based on the produced distribution derives a best case future inflation value, a worst case future inflation value, and a median case future inflation value for the particular period of time;
     employing the best case future inflation value to calculate a best case future value for each of the income and the expenses of the person for the particular period of time;
     employing the worst case future inflation value to calculate a worst case future value for each of the income and the expenses of the person for the particular period of time;
     employing the median case future inflation value to calculate a median case future value for each of the income and the expenses of the person for the particular period of time; and
   employing the best case future value for the assets, the worst case future value for the assets, the median case future value for the assets of the person, the best case future value for each of the income and the expenses, the worst case future value for each of the income and the expenses, and the median case future value for each of the income and the expenses of the person to derive best case, worst case, and median case future times of significance to retirement planning for the person.

2. The non-transitory medium of claim 1, further storing instructions for calculating year-over-year percentage change in the future values for each class of assets.

3. The non-transitory medium of claim 1 wherein the analysis is a Monte Carlo analysis.

4. The non-transitory medium of claim 1 wherein the analysis is a computational algorithm which relies on repeated random sampling to compute results.

5. The non-transitory medium of claim 1, wherein the instructions for analysis for each class of assets include instructions for:
   compiling a collection of historical values for the class of assets;
   performing multiple scenarios based on random inputs to calculate expected future values for the class of assets for each of several particular future periods of time;
   deriving a probabilistic distribution with distribution values relating to projected future value for the class of assets for each period of time; and
   deriving the best case future value, the worst case future value, and the median case future value from each probabilistic distribution.

6. The non-transitory medium of claim 5, further storing instructions for calculating year-over-year percentage changes for each projected future value.

7. The non-transitory medium of claim 5 wherein each best case future value is derived as a point in the corresponding distribution where 90 percent of the distribution values are lower, each worst case future value is derived as a point in the corresponding distribution where 10 percent of the distribution values are lower, and each median case future value is derived as a point in the corresponding distribution where 50 percent of the distribution values are lower.

8. A non-transitory computer-readable medium comprising computer-readable instructions, which when executed by a computer processor, provide inflation projection, the computer-readable instructions comprising instructions for:
   obtaining income, expenses and assets of a person;
   employing an analysis that produces a probabilistic distribution of possible future values for inflation for a particular period of time and based on the produced distribution derives a best case future value, a worst case future value, and a median case future value for inflation for the particular period of time;

employing the best case future value for inflation to calculate a best case future value for each of the income and the expenses of the person for the particular period of time;

employing the worst case future value for inflation to calculate a worst case future value for each of the income and the expenses of the person for the particular period of time;

employing the median case future value for inflation to calculate a median case future value for each of the income and the expenses of the person for the particular period of time; and employing the best case future value for each of the income and the expenses of the person, the worst case future value for each of the income and the expenses of the person, and the median case future value for each of the income and the expenses of the person to derive best case, worst case, and median case future times of significance to retirement planning for the person.

9. The non-transitory medium of claim 8, further storing instructions for calculating year-over-year percentage change in the future values for each class of assets.

10. The non-transitory medium of claim 8 wherein the analysis is a Monte Carlo analysis.

11. The non-transitory medium of claim 8 wherein the analysis is a computational algorithm which relies on repeated random sampling to compute results.

12. The non-transitory medium of claim 8 wherein the instructions for the analysis include instructions for:
compiling a collection of historical values for inflation;
performing multiple scenarios based on random inputs to calculate
expected future values for inflation for each of several particular future periods of time;
deriving a probabilistic distribution with distribution values relating to projected future value for inflation for each period of time; and
deriving the best case future value, the worst case future value, and the median case future value from each probabilistic distribution.

13. The non-transitory medium of claim 12, further storing instructions for calculating year-over-year percentage changes for each projected future value.

14. The non-transitory medium of claim 12 wherein each best case future value is derived as a point in the corresponding distribution where 90 percent of the distribution values are lower, each worst case future value is derived as a point in the corresponding distribution where 10 percent of the distribution values are lower, and each median case future value is derived as a point in the corresponding distribution where 50 percent of the distribution values are lower.

15. A non-transitory computer-readable medium comprising computer-readable instructions, which when executed by a computer processor, provide a financial projection system, the computer-readable instructions comprising instructions for:
obtaining income, expenses and assets of a person, and classes that the assets are grouped into;
employing for each of each class of the assets, the income, and the expenses of the person an analysis that produces a probabilistic distribution of possible future values therefor, and based on each produced distribution derives a respective best case future value, a worst case future value, and a median case future value, each analysis being conducted according to a method comprising:
compiling a collection of historical values;
performing multiple scenarios based on random inputs to calculate expected future values for each of several particular future periods of time;
deriving a probabilistic distribution with distribution values relating to projected future value for each period of time; and
deriving a best case future value, a worst case future value, and a median case future value from each probabilistic distribution;
employing each best case future value to calculate a best case future value for the assets of the person;
employing each worst case future value to calculate a worst case future value for the assets of the person;
employing each median case future value to calculate a median future value for the assets of the person; and
employing the best case future value for the assets, the worst case future value for the assets, and the median case future value for the assets of the person to derive best case, worst case, and median case future times of significance to retirement planning for the person.

16. The non-transitory medium of claim 15, further storing instructions for calculating year-over-year percentage change in the future values for each class of assets.

17. The non-transitory medium of claim 15 wherein the analysis is a Monte Carlo analysis.

18. The non-transitory medium of claim 15 wherein the analysis is a computational algorithm which relies on repeated random sampling to compute results.

19. The non-transitory medium of claim 15, further storing instructions for calculating year-over-year percentage changes for each projected future value.

20. The non-transitory medium of claim 15 wherein each best case future value is derived as a point in the corresponding distribution where 90 percent of the distribution values are lower, each worst case future value is derived as a point in the corresponding distribution where 10 percent of the distribution values are lower, and each median case future value is derived as a point in the corresponding distribution where 50 percent of the distribution values are lower.

21. The non-transitory medium of claim 15 wherein each class of assets includes assets that behave at least somewhat similarly to overall market conditions.

* * * * *